March 3, 1970  B. L. GODBERSEN  3,498,485
BOOM AND FORK LIFT APPARATUS
Filed Feb. 23, 1968  3 Sheets-Sheet 1

INVENTOR
BYRON L. GODBERSEN
BY
J. Robert Henderson
ATTORNEY

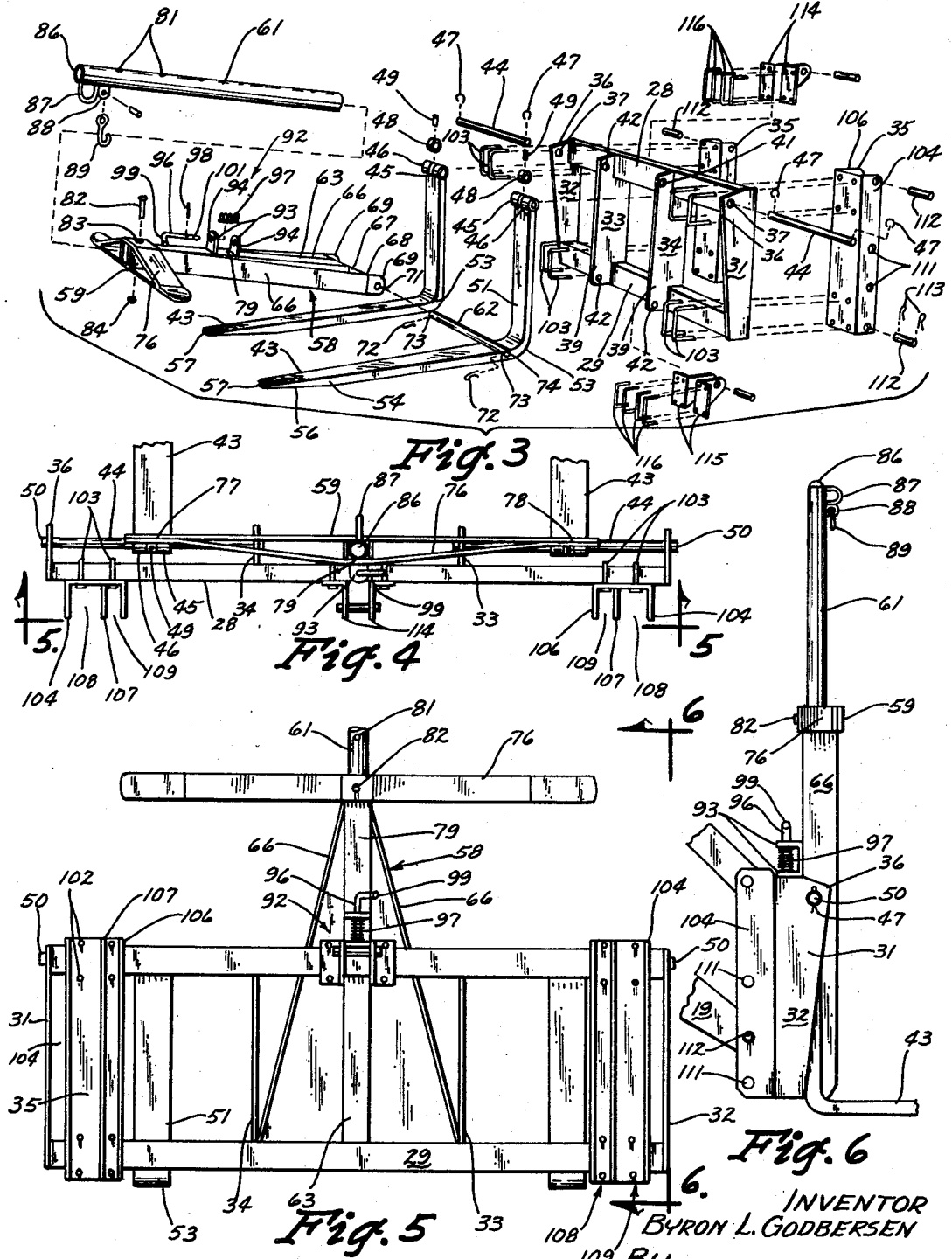

March 3, 1970 — B. L. GODBERSEN — 3,498,485
BOOM AND FORK LIFT APPARATUS
Filed Feb. 23, 1968 — 3 Sheets-Sheet 3

INVENTOR
BYRON L. GODBERSEN
BY
ATTORNEY

United States Patent Office 3,498,485
Patented Mar. 3, 1970

---

3,498,485
BOOM AND FORK LIFT APPARATUS
Byron L. Godbersen, Ida Grove, Iowa 51445
Filed Feb. 23, 1968, Ser. No. 707,827
Int. Cl. B66f 9/00
U.S. Cl. 214—131    8 Claims

ABSTRACT OF THE DISCLOSURE

This invention comprises a universal apparatus for converting a conventional front end loader into a combined fork lift and boom arrangement for greatly increasing the usefulness of the loader; the arrangement being a normally vertically disposed frame adapted for attachment to substantially any front end loader, a fork lift pivotally mounted upon the frame and adapted to have the frame serve as a backstop for the fork lift should the frame be tilted out of a vertical plane with a top part of the frame back toward the loader, and an elongated T-shaped boom pivotally mounted at its base to the base of the frame and centrally of the fork lift, with the boom having either a raised position against the frame or a lowered position resting upon the fork lift and using same as a support.

Background of the invention

The field of this art includes numerous fork lifts and booms separately mounted on powered vehicles; however, the field is void of any practical assemblage of the two in combination or their adaptation for use with a common conventional powered vehicle.

This invention finds its use as a versatile adjunct for a conventional front end scoop loader presently found on many farms and in industry. The invention replaces the scoop of the loader and thereby increases the versatility of the implement without alteration to its basic structure and thus removes the need for costly duplication of implements.

Summary of the invention

This invention relates to a boom and fork lift apparatus capable of readily converting a conventional front end loader to a boom and fork lift, the apparatus comprised of a frame especially constructed to adapt the apparatus for attachment to all commercially available loaders, a plurality of L-shaped bars attached to the frame and extending forward thereof to form the forks, the attachment being such that the weight of a load upon the forks is displaced upon the whole frame, the forks being laterally movable to provide for all type loads, and a boom pivotally mounted on the frame which in a substantially horizontal position rests upon the extended forks to boom lift desired objects, and which in a locked, substantially vertical position serves as a back guard for the fork lift.

It is an object of this invention to provide a novel boom and fork lift apparatus.

It is another object of this invention to provide a boom and fork lift apparatus which may be easily and quickly attached to or detached from a tractor having a conventional three point hitch or the like.

It is yet another object of this invention to provide an apparatus which will adapt a conventional tractor front end loader for use as either a fork lift or a boom, or where both boom and fork are used in cooperation with each other.

It is an object of this invention to provide an apparatus combining a boom with a fork lift and wherein the boom in locked vertical position acts as a back load guard for the fork lift.

It is yet another object to provide an apparatus capable of attaining all of the foregoing objects and which is simple, rugged in construction, economical and practical in use.

These objects and other features and advantages of this invention will become readily apparent upon reference to the following description when taken in conjunction with the accompanying drawings.

Brief description of the drawings

FIG. 3 is an exploded perspective view of the apparatus of this invention;

FIG. 4 is a plan view of the apparatus showing the boom in vertical locked position;

FIG. 5 is a rear elevational view of the apparatus taken along the line 5—5 of FIG. 4;

FIG. 6 is a side elevational view of the apparatus as taken along the line 6—6 of FIG. 5;

DESCRIPTION OF THE PREFERRED EMBODIMENT

Figures 1, 2:
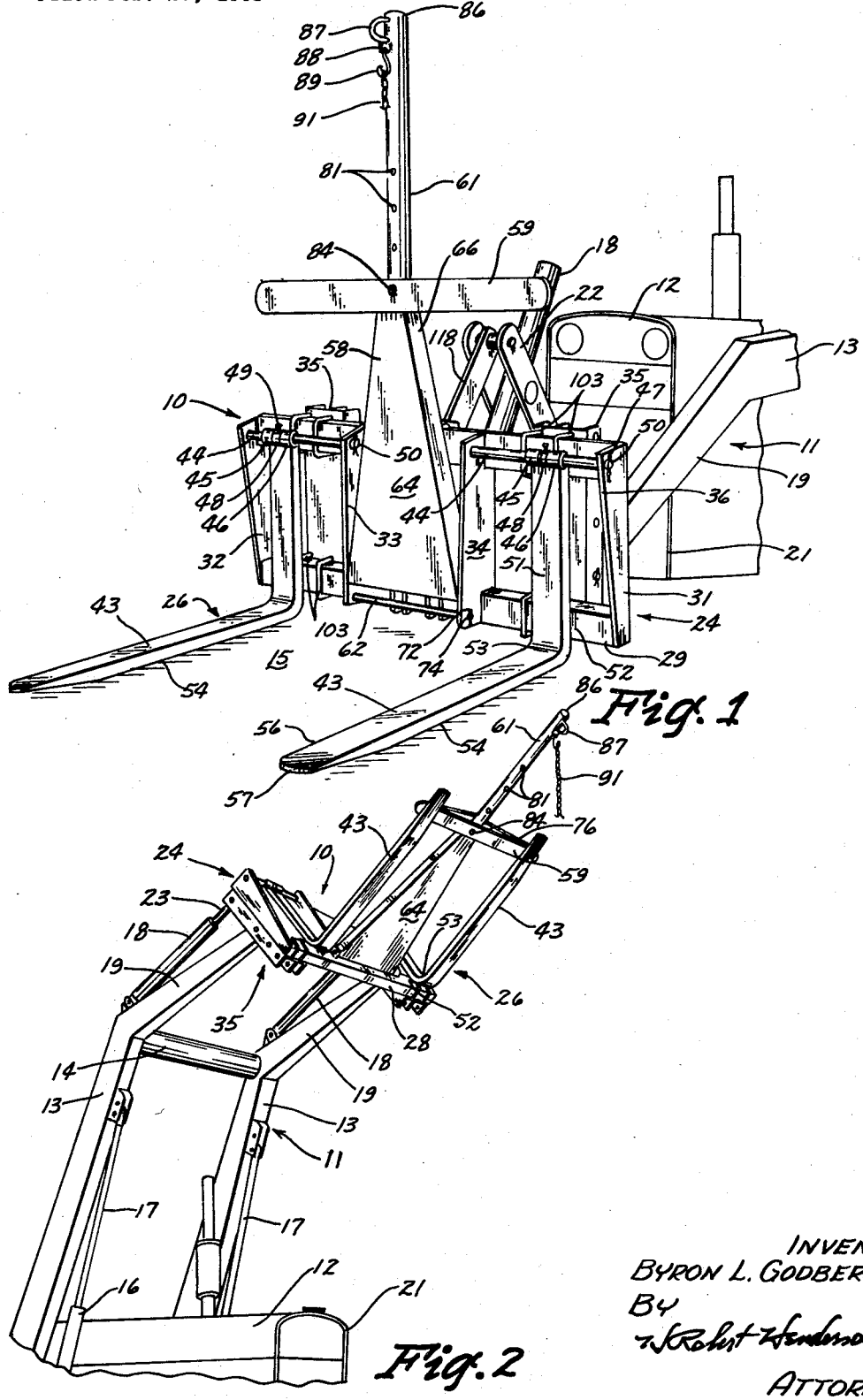
FIG. 1 is a perspective view of the apparatus of this invention mounted to a conventional front end loader.
FIG. 2 is a reduced perspective view of the apparatus of this invention showing the boom resting upon the extended forks.

Referring now to the drawings, and particularly FIG. 1, the boom and fork lift apparatus of this invention is indicated generally at 10 and is shown in assembled relation with a front end loader lift arm unit 11 attached to a conventional tractor 12.

The lift arm unit 11 comprises generally that portion of a commercially available front end loader with the scoop or shovel removed. The remaining portion 11 (FIGS. 1 and 2) consists generally of arms 13 pivotally mounted on each side of the tractor 12, a horizontal cross-bar 14 connecting the arms 13, power arms comprising hydraulic cylinders 16 and rods 17 to raise and lower the arms 13 relative to the ground 15, and a forwardly mounted hydraulic cylinder 18 (FIG. 1) or cylinders 18 (FIG. 2) to pivotally tilt the apparatus 10 relative to the arms 13 for control purposes when lifting, lowering, and transporting a load upon the apparatus 10.

The lift arms 13 are beveled beams pivotally connected at one end (not shown) to a base unit (not shown) attached to the tractor 12 rearward of the tractor engine. The forward end 19 of the beam 13 is angled downwardly (FIG. 1) to connect the boom and fork apparatus 10.

A pair of hydraulic cylinders 16 (FIG. 2) attach to a base unit (not shown) connected to the tractor 12 and are fluidly connected to a power source from the tractor 12. A shaft 17 extends from the cylinders 16 and engages the lift arms 13, to raise and lower the arms 13 relative to the ground 15. When the shafts 17 are in extended position (FIG. 2), the arms 13 and apparatus 10 are raised above the ground and when the shafts 17 are retracted into the cylinders 16, the arms 13 and apparatus 10 take the position of FIG. 1.

Connecting the lift arms 13 forward of the front 21 of the tractor 12 is a cross bar 14 (FIG. 2) to provide lateral support to the arms 13. The cross bar 14 also serves as a base to mount a forward hydraulic cylinder 18 and leverage arm 22 in some commercial front end loader units 11 such as a J. I. Case Construction King in which a single forward hydraulic cylinder 18 (FIG. 1) is employed.

The forward hydraulic cylinders 18 (FIGS. 1 and 2) used to pivot the apparatus 10 are included in all lift arm units 11 and forwardly attach to the unit 11. The pivot cylinders 18 are powered by the tractor 12 and are fluidly connected to controls (not shown) easily accessable to the tractor operator. A shaft arm 23 (FIG. 2) is included within the pivot cylinder 18 and connects the frame 24 of the apparatus 10 as hereinafter described.

The boom and fork lift apparatus 10 of this invention comprises generally a rectangular frame unit 24 of steel or the like (FIGS. 1 and 3) attached to the lift arm unit 11. Pivotally mounted on the forward side of the frame unit 24 is a fork unit 26 and a boom unit 27.

The basic frame unit 24 consists generally of two elongated horizontal parallel beams 28, 29 forming the top 28 and bottom 29 of the frame unit 24. Attached as by welding are two vertical plates 31, 32 which form the sides of the frame unit 24. Interconnecting the two beams 28, 29 and in spaced relation to the side plates 31, 32 is a second set of vertical plates 33, 34. A pair of channel mounting members 35, each a mirror image of the other, are vertically attached to the back side of the frame unit 24 facing the tractor 12.

Specifically, the two side plates 31, 32 are identical and therefore only one 31 will be described. The plate 31 is flat, and has an upper portion 36 of the plate 31 which extends outward from the top beam 28 as best illustrated in FIGS. 3 and 6. A hole 37 (FIG. 3) is formed through the extended portion 36 away from the top beam 28 for attachment to the fork unit 26 as hereinafter described.

The inner vertical plates 33, 34 (FIG. 3) are likewise identical and for purposes of simplicity, only one 34 will be described. The plate 34 is also flat and is attached to the beams 28, 29 as by welding. The extended portion 39 of the plate 34 protrudes from the beams 28, 29 the same distance as the extended portion 36 of the plate 31 extends from the beam 28.

Through the extended portion 39 of the plate 34 away from the beams 28, 29 a hole 41, 42 is formed, each hole being of the same diameter as the hole 37 formed in end plates 31, 32. The top hole 41 is horizontally aligned with hole 37 formed in the end plates 31, 32 to receive and attach the fork unit 26. Likewise, the bottom holes 42 are horizontally aligned to receive and attach the boom unit 27.

The fork unit 26 (FIG. 1) consists of a pair of L-shaped bars 43 pivotally mounted on a horizontal rod 44 attached to the frame unit 24. The bars 43 form the forks of the unit 26 and are attached, as by welding, to two identical cylinders 45, 46 through which the rod 44 traverses, permitting lateral movement of the fork 43 upon the rod 44. A bushing 48 encircles the rod 44 and is positioned between the two cylinders 45, 46 and adjacent thereto. A set-screw 49 extends through the bushing 48 to the rod 44 securing the bushing 48 about the rod 44 and thereby serves to retard unwarranted lateral movement of the fork 43 upon the rod 44. The rod 44 traverses the plates 32, 33 and 31, 34 through holes 37 and 41 as hereinbefore described, and is secured by a plurality of pivot keys 47 inserted through the rod ends 50 protruding through the plates 31, 32, 33, 34, thereby attaching the fork 43 to the frame unit 24.

The L-shaped bar 43 (FIG. 1) thus depends downward from the rod 44 to a point 53 beyond the lower beam 29 where it is curved at a 90° angle outward from the beam 29. At the forward end 56 of the bar 43, the bottom portion 54 biases upward to form a blunt tip 57. As the bar 43 depends downward, it intersects and rests against the front face 52 of the beam 29 just above the curve 53 of the bar 43.

The provision of a pivotal and lateral mounting of the fork bar 43 to the frame unit 24 increases the versatility of the fork 43 in addition to providing a greater distribution of the lifted weight upon the frame unit 24. The lateral movement of the forks 43 permits the forks 43 to be more broadly spaced when using the fork unit 26 for moving extraordinary long loads, such as lumber; while narrowing the space between the forks 43 permits the use of the fork unit 26 for lifting such items as oil drums by attaching the fork 43 below the ridge commonly found surrounding such drums. In addition, lateral positioning facilitates use of the fork unit 26 with irregular pallets. The pivotal mounting of the forks 43 upon the frame unit 24 permits easier handling of the load as the forks 43 remain generally horizontal unless the top 28 of the frame unit 24 is tilted backward, in addition to more evenly distributing the weight of the load about the whole frame unit 24.

The boom unit 27 generally comprises a triangular shaped base 58 and boom rod 61 pivotally mounted to a bar 62 secured to the frame unit 24. Attached to the base 58 is a horizontal cross member 59 which extends substantially the width of the frame unit 24.

The base 58 of the boom unit 27 comprises a substantially square tube or core 63 (FIGS. 3 and 5) extending substantially the length of the base 58. The tube 63 is attached as by welding to a triangular shaped plate 64 having flanged sides 66. The tube 63 is positioned on the plate 64 such that the tube bisects the triangular plate 64.

The side flanges 66 extend beyond the bottom base flange 67 and are angled 68 to be parallel to the longitudinal axis of the tube 63. The side flange extensions 69 are provided with a hole 71 (FIG. 3) therein formed to receive a pivot rod 62 traversing the plates 33, 34 (FIG. 1) through holes 42 therein provided and thereby attaching the boom unit 27 to the frame unit 24. The pivot rod 62 is secured to the frame unit 24 by cotter keys 72 inserted through holes 73 (FIG. 3) formed in that portion 74 of the rod 62 extending beyond the plates 33, 34.

An elongated rod or boom 61 is inserted within the base tube 63 (broken lines, FIG. 3) and frictionally mounted therein. The boom rod 61 is of heavy steel material and may be either tubular or solid. The boom 61 is provided with a plurality of holes 81 intermittently spaced to receive a bolt 82 traversing the base tube 63 (FIG. 3) through a hole 83 therein provided permitting variable extension of the boom 61 as desired by the operator. The bolt 82 is secured by a nut 84. Attached near the end 86 of the boom 61 is a heavy loop 87 and bracket 88 for attachment of a hook 89. The hook 89 serves to grasp a link of chain 91 secured to an object (not shown) to be boom lifted while the loop 87 serves as an attachment for threading a chain or like material which in turn is secured to an object to be boom lifted.

The cross member 59 of the boom unit 27 is an elongated rigid strap 59 extending substantially the width of the frame unit 24. The strap 59 is attached to the front of the base 58 and perpendicular to the longitudinal axis of the base tube 63. A support arm 76 is bent about the back 79 of the tube 63 (FIGS. 3 and 4) and attached to both ends 77, 78 of the strap 59. The strap 59 and support 76 thus form a cross member 59 for supporting the boom unit 27 in a lowered position (FIG. 2) and as a back guard for the fork unit 26 in raised position (FIG. 1).

To secure the pivotal boom unit 27 in a raised position (FIGS. 1 and 6) a hand operated lock 92 is provided. The lock 92 comprises a pair of brackets 93 (FIG. 3) attached to the back side 79 of the tube 63. The brackets 93 are provided with a hole 94 formed therein and aligned to receive an L-shaped pin 96 inserted through a coil spring 97 positioned between the brackets 93 and secured to the pin 96 by a cotter pin 98. The horizontal portion 99 of the pin 96 acts as a handle to grip the pin 96 while the vertical end 101 which extends through the bracket 93 engages the horizontal beam 28 of the frame unit 24, and locks the boom unit 27 in a raised position.

The boom unit 27 is functional in both raised (FIGS. 1 and 6) or lowered (FIG. 2) position. In the raised position (FIG. 1) the boom unit 27 forms a back guard for the fork unit 26 and permits higher load stacking. In the raised position, the boom unit 27 may also be employed to stabilize a broad load supported by the forks 43 by extending a chain 91 or cable from the boom 61 to the side of the load opposite the frame unit 24. The normal operational position of the boom unit 27, however, is in lowered position as best illustrated in FIG. 2.

To lower the boom unit 27, the operator will lift the lock pin 92 disengaging the boom unit 27 from the beam 28 and lower the unit 27 to where the cross member 59 engages the forks 43, thereby partially distributing some of the weight upon the forks 43. The operator may then elect to extend the boom 61 from the base 58, the decision normally based the width of the object to the boom lifted.

A desired object of the apparatus 10 of this invention is to adapt the particular apparatus 10 to attach to all commercially available lift arm units 11. To provide for this object, a pair of identical vertical channel members 35 (FIGS. 1 and 3) attach to the back of frame beams 28, 29 by a plurality of U-bolts 103 secured by nuts 102. The channel member 35 is an elongated, heavy beam having flanged sides 104, 106 and a plate 107 attached to the beam 35 within the flanges 104, 106 and extending parallel thereto so that in cross section the channel member 35 appears as an E (FIG. 4). The plate 107 is positioned off-center as best illustrated in FIGS. 4 and 5, and thereby creates a wide and narrow channel within the member 35. A plurality of horizontally aligned holes 111 are formed in the flanges 104, 106 and plate 107 to receive mounting pegs 112 (FIG. 3) securely positioned by keyed wire rings 113.

Figure 10:
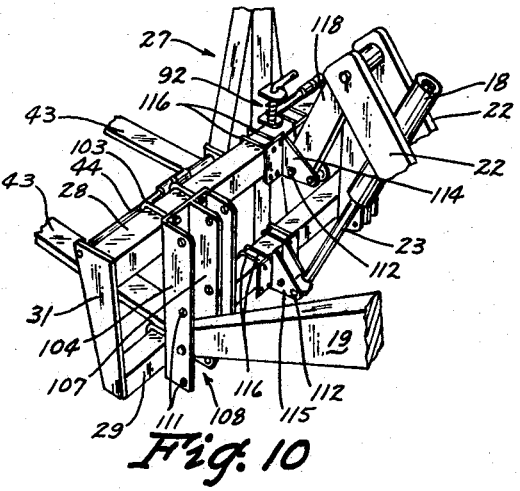
FIG. 10 is a perspective view of the apparatus showing attachment to the apparatus with a single hydraulic cylinder.

The wide channel 108 (FIGS. 4 and 5) formed by the flange 104 and plate 107 receives the extended lift arm 19 (FIGS. 7, 8 and 10) which is pivotally secured by a peg 112 traversing the holes 111 formed in the flange 104 and plate 107, and a hole (not shown) provided in the lift arm 19. The use of the keyed pins 113 (FIGS. 3 and 8) facilitates easy mounting and disengagement of the unit 10 from the lift arm unit 11.

The majority of lift arm units 11 will employ two forwardly mounted hydraulic cylinders 18 (FIGS. 7 and 8) and the channel member 35 are all that is required to attach the apparatus 10 to the lift arm unit 11 in this situation. The lift arm 19 is first attached to the apparatus 10 as hereinbefore described, then the cylinder arms 23 are pivotally attached to the member 35 by pegs 112 and secured by keyed pins 113 in the same manner as the lift arms 19 are attached.

If the lift arm unit 11 attaches to the hydraulic cylinders 18 in the same plane as the lift arms 19 (FIGS. 2 and 8), the cylinder shaft 23 is mounted within the wide channel 108 of the member 35. Should the lift arm unit 11 attach to the hydraulic cylinders 18 within the lift arms 19 (FIG. 7), and adjacent thereto, the cylinder shaft 23 connects the apparatus 10 within the narrow channel 109 of the mounting member 35 in the same manner as previously described.

Figure 7:
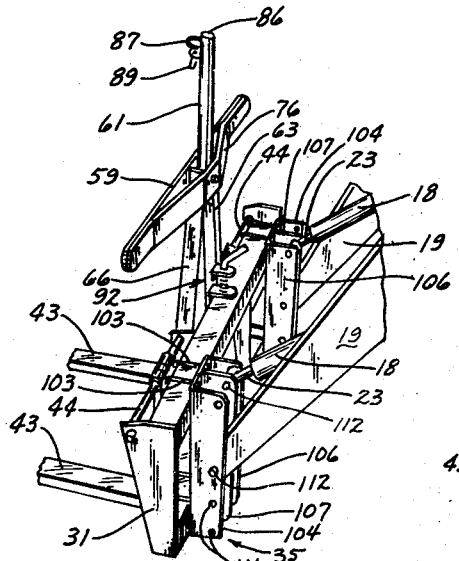
FIG. 7 is a perspective view of the apparatus showing dual hydraulic cylinders connected within the lift arms.
Figure 8:
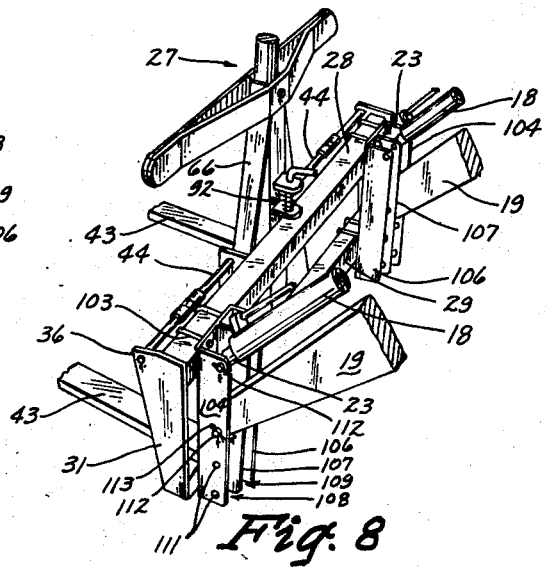
FIG. 8 is a perspective view of the apparatus showing dual hydraulic cylinders connected above the lift arms.

A modification of the mounting assembly of the frame unit 24 is required when connecting a lift arm unit 11 embodying only one forward hydraulic cylinder 18 (FIGS. 1 and 10) to the apparatus 10. The necessary modification includes the mounting of identical brackets 114, 115 centrally to the frame beams 28, 29, respectively, by a plurality of U-bolts 116 secured by nuts. The lift arms 19 are attached to the channel member 35 in the same manner in this modification as previously described for the double cylinder mounting (FIGS. 7 and 8). This modification provides for the pivotal attachment of the single cylinder 18 to the lower mounting bracket 115 by the use of pegs 112 secured by the usual pins 113.

The single cylinder lift arm unit 19 employs an additional leverage arm 118 which is attached to mounting bracket 114 in the manner previously described. It is to be recognized that some commercial lift arm unit 11 models reverse the arrangement of the single cylinder 18 and the leverage arm 118 such that the leverage arm 118 would then connect the bottom bracket 115 and the cylinder shaft 23 would connect the upper bracket 114. It is also recognized that some single cylinder 18 models are void of a leverage arm 118, therefore only one bracket 115 will be required to connect the single cylinder 18 of those models.

Figure 9:
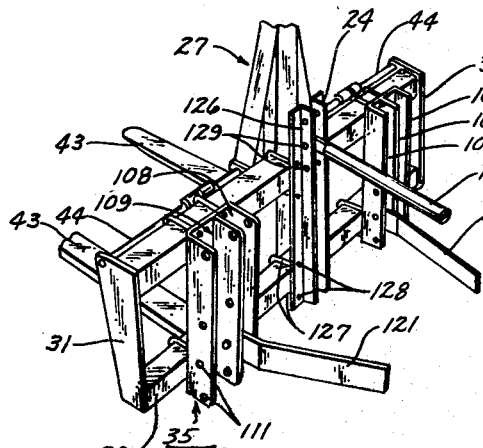
FIG. 9 is a perspective view of the apparatus showing attachment to a conventional three point hitch.

Yet another modification of mounting the apparatus 10 to a tractor 12 is illustrated in FIG. 9 in which the apparatus 10 attaches to the tractor 12 by the use of a "three-point hitch" as commonly found on many tractors 12 rather than by use of a lift arm unit 11 from a front end loader attachment. The "three-point hitch" as commonly found on may tractors consists of a pair of elongated, hydraulically powered lift arms 121, 122 attached to each side of a tractor 12 and diverge rearwardly behind the tractor 12. The arms 121, 122 are movable relative to the ground. A third elongated arm or rod 123 attaches at one end to the tractor 12 above the side arm 121, 122 attachment and acts as a stabilizing or leverage arm 123.

To mount the apparatus 10 to the tractor 12 via the "three-point hitch," it is necessary to attach a pair of elongated angle irons 124, 126 diametrically opposed to each other to the frame beams 28, 29 by means of U-bolts 127 secured by nuts 128. The angle irons 124, 126 are vertically mounted centrally upon the beams 28, 29 and are provided with a plurality of horizontally aligned holes 129. To connect the apparatus 10, the powered arms 121, 122 are pivotally attached to the hereinbefore described channel mounting member 35 by use of pegs 112 secured by keyed pins 113. The arms 124, 126 may mount within either the narrow channel 109 or the wide channel 108 of the member 35. The stabilizing arm 123 or third member of the three-point hitch is pivotally mounted to the angle irons 124, 126 by means of a peg 112 inserted through the holes 129 formed in the angle irons 124, 126.

It may be seen, therefore, that a boom and fork lift apparatus 10 may easily and quickly be attached to either a front end loader lift arm unit 11 or a "three-point hitch" 121, 123, 123 arrangement by the insertion of but three or four pegs 112 secured by keyed pins 113, wherein the boom and fork lift apparatus 10 is vertically movable by the hydraulically powered lift arms 19, 121, 122 and horizontally movable by the directional motion of the tractor 12.

I claim:

1. A boom and fork apparatus for a powered implement having a pair of lift arms mounted on the implement and extending forward thereof, the arms capable of being raised and lowered relative to the ground, the implement having also at least a power arm cooperable with the lift arms, the boom and fork apparatus comprising:
   frame means adapted for detachable engagement with the lift and power arms;
   fork means including a plurality of bars mounted on said frame means and each bar having a portion thereof extending forwardly of said frame means and away from the arms; and
   boom means pivotally mounted on said frame means and operable in a first position releasably locked to said frame means, and in a second position moved toward engagement with said fork means.

2. A boom and fork attachment as defined in claim 1, and further wherein said frame means includes substantially vertically disposed channel members, said members having a plurality of horizontally aligned apertures formed therein for receiving a pin extended transversely to the longitudinal extent of said arms.

3. A boom and fork attachment as defined in claim 2, and further wherein said members are doubled channeled.

4. A boom and fork attachment as defined in claim 1, and wherein said frame means includes substantially vertically disposed channel members, said members having a plurality of horizontally aligned apertures formed therein for selectively attaching said frame means to the arms, and further wherein said frame means includes one or more brackets for attachment to a power arm.

5. A boom and fork attachment as defined in claim 1, and wherein said bars are L-shaped, each bar having a normally vertical portion and a horizontal portion extended at right angles to said vertical portion, said vertical portion of each bar pivotally connected at its upper end to said frame means and adapted to rest against said frame means in one position thereof, and adapted to tend to retain its vertical position in another position of said frame means.

6. A boom and fork attachment as defined in claim 1, and further wherein said boom means includes an elongated boom telescopically mounted within an elongated base, said base pivotally mounted on said frame means.

7. A boom and fork attachment as defined in claim 1, and further wherein said boom means includes an elongated boom mounted on an elongated base, said base pivotally mounted on said frame means centrally between a pair of said bars.

8. A boom and fork attachment as defined in claim 7, and further wherein said base includes a cross-member mounted on said base and forming a T-shape therewith, said cross-member having a length greater than the distance between said pair of bars, said cross-member engaged with and extended between said bars in said second position of said boom means.

References Cited

UNITED STATES PATENTS

| | | |
|---|---|---|
| 2,471,429 | 5/1949 | Hawkins. |
| 3,207,347 | 9/1965 | Ehrlich _____ 214—620 |
| 3,341,040 | 9/1967 | Blair _____ 214—145 X |

FOREIGN PATENTS 539,502  4/1957  Canada.

HUGO O. SCHULZ, Primary Examiner

U.S. Cl. X.R.

214—620